United States Patent [19]

Games

[11] 3,777,123
[45] Dec. 4, 1973

[54] TRUE DISTANCE TO WAY POINT AND OFFSET COMPUTER

[75] Inventor: John E. Games, Granby, Conn.

[73] Assignee: United Aircraft Corporation, East Hartford, Conn.

[22] Filed: July 3, 1972

[21] Appl. No.: 268,253

[52] U.S. Cl. ........ 235/150.27, 235/150.26, 235/186, 244/77 B, 343/112 C, 343/112 D
[51] Int. Cl. ............................................. G06g 7/78
[58] Field of Search ................ 235/150.26, 150.27, 235/186–192; 244/77 R, 77 B; 343/10, 12, 112 A, 112 C, 112 D

[56] References Cited
UNITED STATES PATENTS
3,097,357   7/1963   Durnal ........................... 343/112 C
2,610,789   9/1952   Hales .................................. 235/192

*Primary Examiner*—Eugene G. Botz
*Assistant Examiner*—R. Stephen Dildine, Jr.
*Attorney*—Melvin Pearson Williams

[57] ABSTRACT

Navigation equipment provides AC signals proportional to X and Y coordinates of an aircraft with respect to a selected way point which are applied to opposite ends of a series RC circuit, the center of which is used as an input to a triangle solving means, as is an offset indicating signal (designating the amount by which a parallel track to be flown is offset from the track to the way point) to provide a true distance to way point signal. When the offset amount is zero, true distance to way point is still achieved. True distance to way point without offset is provided by synchronously demodulating the center tap of the R/C circuit. True distance to way point is provided even when flying in a circle, or when flying a track which is offset from and parallel to a previously established track to a way point.

4 Claims, 6 Drawing Figures

TRUE DISTANCE TO WAY POINT AND OFFSET COMPUTER

BACKGROUND OF THE INVENTION

1. Field of Invention

This invention relates to navigational computers, and more particularly to provision of true distance to way point.

2. Description of the Prior Art

Aircraft navigation computers utilize signals from ground stations to determine the absolute position of the aircraft with respect to the ground, and from the aircraft's position, can determine courses and distances to arbitrarily selected way points, which may either be a ground station as such or some other way point not related thereto. One function which some of the known navigational computers provide is the distance to the way point. However, this frequently is actually computed as an along-track distance to the way point which becomes inaccurate whenever the airplane is off the track. For instance, devices which provide distance to the way point as the quadrature output of a differential resolver, the rotor of which is adjusted to provide the heading of the track to a selected way point by the pilot, actually provides only the alongtrack distance at the track heading. Whenever the craft is off the track, this distance is in error. A craft may be off track for several reasons. One reason is the craft may be flying on track to a point leading toward a landing pattern, and may be instructed to fly a circle about the way point in order to delay its arrival. Once the aircraft enters the circle, the distance along track will vary sinusoidally as will the cross track error. Another example is when, such as to mitigate chances of collision, an aircraft is instructed to fly a track which is some number of miles offset from and parallel to his originally planned track to an original way point. While approaching an offset way point (that is, a point distant from the selected way point along a line perpendicular to the track of the original way point) the area navigation computer apparatus might provide only the distance to the original way point, which is a greater distance than that to the offset way point.

Some navigational computers have provided true distance to the way point, rather than along track distance component of the distance to way point. However, such devices are complex and therefore are heavy, expensive and subject to failure.

SUMMARY OF INVENTION

The object of the present invention is to provide simplified and improved means for generating a true distance to way point indication; another object is to provide a distance to way point computer which can generate a distance to an offset way point as well as a true distance to way point indication.

In accordance with the present invention, the coordinates of an aircraft to a radio navigation ground station and the coordinates of the selected way point to said ground station are combined to provide the true distance of the aircraft to the selected way point, which is in turn combined with an offset, that is, an amount by which a desired track to be flown, parallel to the track to the selected way point, is to be offset from the track to the selected way point, to provide the true distance to an offset way point which is a point on the parallel track and offset from the selected way point in a direction perpendicular to the track to the selected way point.

The present invention allows flying a parallel track without readjusting the navigation computer; this is important since it permits automatic way point insertion while at the same time responding to commands from the ground to fly a parallel track in order to avoid collision or the like. The present invention provides true distance to an instantaneous way point, whether it be an offset way point or the originally selected way point as provided by the area navigation computer apparatus.

The present invention may be implemented in a variety of forms, those disclosed herein being analog, but it may also be implemented in a digital fashion simply by the proper combination of indications of the aircraft position with respect to a selected way point and indications of any desired offset.

According further to the present invention, sinusoidal signals proportional to the X and Y coordinates of an aircraft to a selected way point are applied to opposite ends of an R/C circuit, the center of which is demodulated to provide true distance to way point.

According still further to the invention, the demodulation of the signal derived from the X and Y signals is achieved in a triangle resolution apparatus, thereby to provide true distance to an offset way point in response to an offset signal which is also applied to the triangle resolution apparatus. The present invention provides true distance to way point in response to very simple circuitry comprising, in its simplest embodiment, a series R/C circuit and a synchronous demodulator. The invention further provides, with relatively simple circuitry which is easy to implement, demodulation of true distance to way point in response to an offset signal in a triangle resolution apparatus which thereby provides true distance to an offset way point, or will provide true distance to a way point which is not offset, automatically.

The present invention provides improved performance with or without offset, and does so in a manner which does not add significantly to the weight or cost of navigational equipment.

Other objects, features and advantages of the present invention will become more apparent in the light of the following detailed description of navigational situations relating thereto and preferred embodiments thereof, as illustrated in the accompanying drawing.

DESCRIPTION OF THE PREFERRED EMBODIMENT

Figure 1:
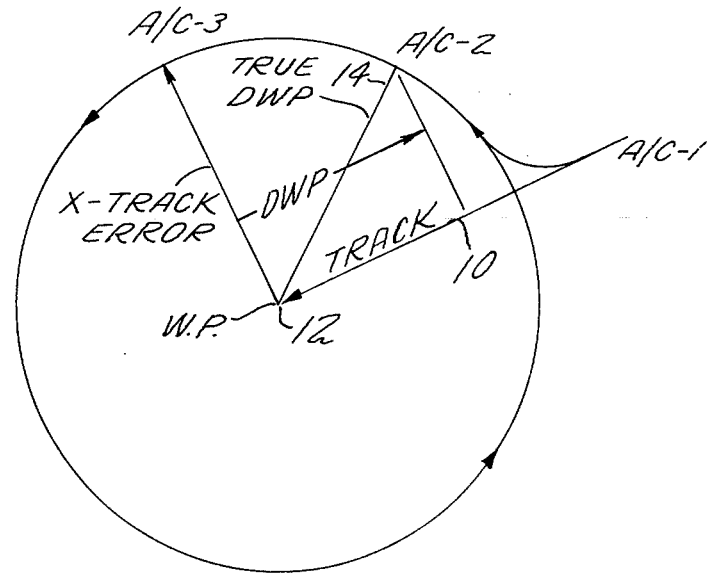
FIG. 1 is a diagram illustrative of navigation of an aircraft in a circle about a way point.

Referring now to FIG. 1, an aircraft may be flying along a track 10 to a way point 12 in response to area navigation computing equipment which provides course and distance to the way point in response to pilot-selected coordinates of the way point and the aircraft's actual position as determined by electronic aircraft locater equipment, such as the well known VOR/DME equipment widely in use. While flying along the track, it is a really simple matter to provide a fairly accurate cross track error resulting from minor deviations in heading, and to provide the distance to way point so long as the craft is on the track. One method of doing so has been to utilize the quadrature outputs of a track selecting differential resolver, the position of the rotor of which is adjusted by the pilot to define the bearing or track to the selected way point. In such a case, once the aircraft leaves the track, the differential resolver provides only the projection of the distance to way point on the track. For instance, assume that the aircraft is at the position A/C–1 when it gets a command to fly a circle about the way point 12. At first, the distance to way point will remain fairly accurate and not vary too much, while the cross track error becomes very large. When it reaches the position A/C–2, the distance to way point indication is in fact the projection of the true distance to way point on the track 10. As it reaches the position A/C–3, the distance to way point is indicated as being zero by the area navigation equipment. At that time the cross track error is maximum. In fact, as the aircraft flies about a circle, the cross track error and the distance to way point will both vary sinusoidally, and in quadrature with each other. In accordance with the invention, as described hereinafter, generation of the true distance to way point such as that indicated for the position A/C–2 by the line 14, permits the pilot simply to maintain a constant distance to way point in order to assure that he is flying in a circle.

Figure 2:
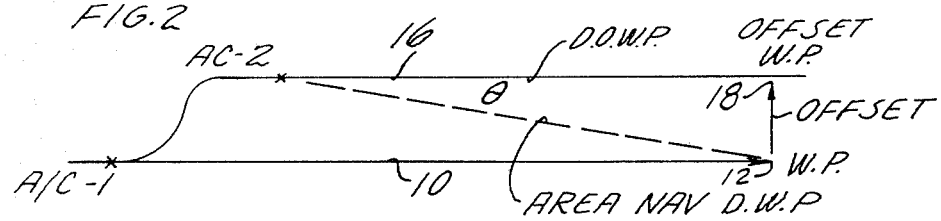
FIG. 2 is a diagram illustrative of navigating a craft on a track which is offset from and parallel to a track to a selected way point.

Another situation is illustrated in FIG. 2. Therein, assume the aircraft is initially flying on a track 10 to a way point 12. It may then get a command to fly a parallel course for some period of time, such as to mitigate the chances of collision. Thus, if at the point A/C–1 it alters its course to the left to assume a parallel track 16, the area navigation computer will still provide distances, courses and cross track errors to the original way point 12. In accordance with the invention, as is described hereinafter, a true distance to an offset way point 18 is provided along the track 16 without resetting of the area navigation equipment, and by the simple expedient of setting in the value of the offset.

Figure 3:
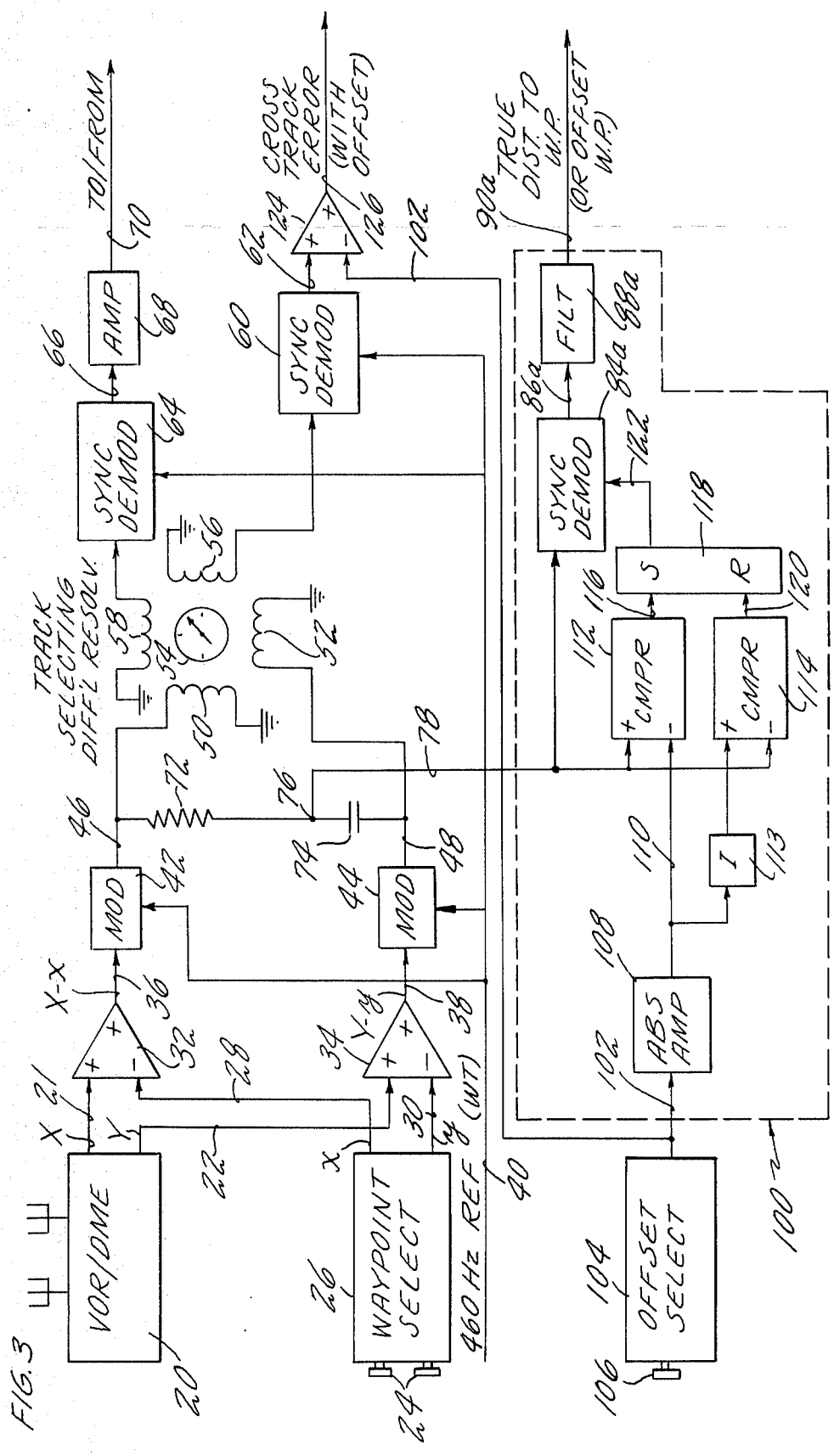
FIG. 3 is a schematic block diagram of a preferred embodiment of the invention.

Referring now to FIG. 3, airborne VOR/DME equipment 20, which may be of any well known type, provides signals proportional to X and Y coordinates of the aircraft as related to the VOR/DME ground station on a pair of lines 21, 22. The pilot selects a way point by manipulating a pair of knobs 24 so that the way point selecting equipment 26 responsive thereto will provide signals on a pair of lines 28, 30 which are proportional to the coordinates of the way point with respect to the VOR/DME ground station. A first difference amplifier 32 provides the difference in the aircraft and way point X coordinates and a second differencing circuit 34 provides the difference in the aircraft and way point Y coordinates. These provide signals on corresponding line 36, 38 which are proportional to the X and Y coordinates of the aircraft with respect to the way point.

Figure 4:
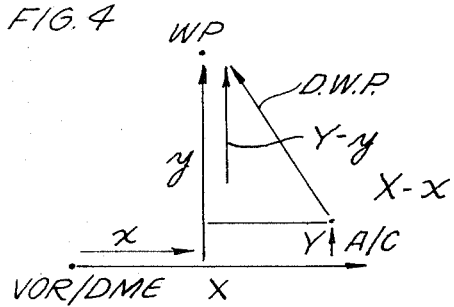
FIG. 4 is a diagram illustrating coordinates of a craft to a way point.

As is illustrated in FIG. 4 the distance to the way point is the hypotenuse of the triangle whereas the signals on the lines 36, and 38 comprise the sides of the triangle. Thus, the distance to way point (D.W.P.) may be expressed as $$\text{D.W.P.} = \sqrt{(X-x)^2 + (Y-y)^2} \qquad (1)$$

In order to operate with these signals, which provide an indication of the instantaneous position of the aircraft with respect to the selected way point, the signals are provided with an accurately controlled frequency AC carrier which may for instance comprise a 460 Hz signal on a line 40. The signals are modulated and sine wave filter (via a pass band filter) in respective modulators 42, 44 so as to provide signals at related outputs 46, 48 which are $$(X - x) \sin wt \qquad (2)$$

$$(Y - y) \sin wt \qquad (3)$$

To revolve the X and Y coordinate signals to generate distance to way point, the signals on the lines 46, 48 are applied to respective, quadrature-related input windings 50, 52 of a differential resolver of the type known in the art for this purpose. As is known, the rotor 54 is adjusted by the pilot in accordance with a chart or tables which provides him tracks from one way point to the next way point in the plan of the flight. The output of one winding 56 of the differential resolver may be expressed as $k$ (D.W.P.) $\sin (\psi - \alpha) \sin wt$ (4)

where $\psi$ is the track angle setting of the rotor 54, $\alpha$ is the angle of the aircraft's actual track, and wt is the carrier. Similarly, the quadrature output winding 58 provides a signal which can be expressed as K (D.W.P.) $\cos (\psi - \alpha) \sin wt$ (5)

Figure 5:
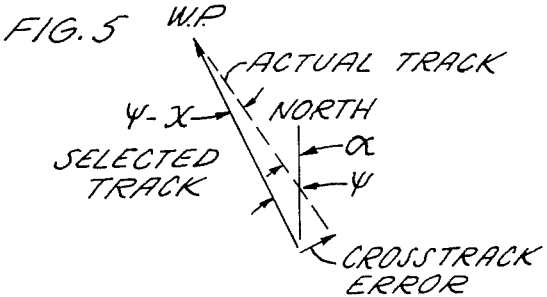
FIG. 5 is a diagram illustrating along-track distance and cross-track error.

As illustrated in FIG. 5 the distance to the way point times the sine of the error angle $(\psi - \alpha)$ comprises the cross track error, and has been used as such in the prior art. On the other hand, the output winding 58 provides a signal which is the distance to the way point times the cosine of the error angle and thus comprises the distance from the point where the aircraft is supposed to be (on the track) to the way point, which may be referred to as the along-track distance to way point. This has been used in the prior art to provide distance to way point, but is not a true distance to way point whenever there is cross track error, and as described with respect to FIG. 1 hereinbefore, this prevents its use in flying a circle about a selected way point. In the present embodiment, the output of the winding 56 is applied to a synchronous demodulator 60 which also receives the 460 Hz reference signal on the line 40 so as to provide a DC signal on a line 62 which is proportional to cross track error. Similarly, the winding 58 is applied to a synchronous demodulator 64 which provides a DC signal on a line 66 proportional to along-track distance. In the present embodiment, the signal on the line 66 is used only to provide a to/from signal in dependence upon the sense or polarity of the signal. This is achieved by a low threshold, high gain amplifier 68 which simply acts as a polarity sensor to provide a signal on a line 70 having a polarity indicating that the aircraft is flying to the way point or from the way point.

In accordance with a first aspect of the present invention, the true distance to way point is derived in a novel manner. The output of the modulators 42, and 48 are applied across a series RC circuit comprising a resistor 72 and a capacitor 74 so chosen that their impedance at wt are equal. The center or junction 76 of the RC circuit provides a signal on a line 78 which is equal to $$\sqrt{[(X-x)^2 + (Y-y)^2]/2} \; [\sin(wt - \theta + 45°)] \quad (6)$$

where $\theta = \arctan(X - x)/(Y - y)$
so that it equals $$[D.W.P./\sqrt{2}] \sin(wt - \theta + 45°) \quad (7)$$

Note that accurate control of AC frequency and RC components is required to obtain the above results, using techniques well known in the art.

Figure 6:
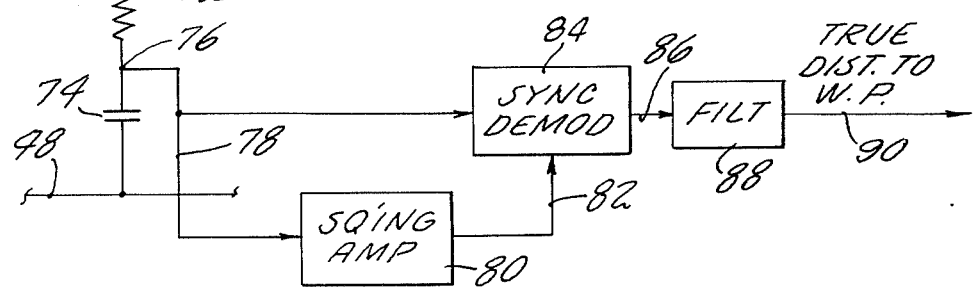
FIG. 6 is a partial, simplified schematic diagram of an embodiment employing the basic principal of the present invention.

Thus the signal on the line 78 has a magnitude to the square root of the sum of the squares, and therefore proportional to the true distance to the way point. Referring briefly to FIG. 6, by applying the signal on the line 78 to a squaring amplifier 80, which simply comprises a hard-limited high gain amplifier as is known in the art, a square wave signal is generated on a line 82 which has the same phase characteristics as the signal on the line 78. This can be applied to the phase reference input of a synchronous demodulator 84 which receives at the signal input thereof the signal on the line 78. The output of the synchronous demodulator 84 on the line 86 which is a full wave rectified version of the input signal, the amplitude of which is proportional to the input amplitude. In other words, the peak amplitude of the signal on the line 86 is given as:

$$(D.W.P./\sqrt{2}) \quad (8)$$

By applying this to a filter 88 there is provided on a signal line 90 a DC signal having an amplitude proportional to the true distance to the way point. The filter 88 may preferably comprise an active filter including an amplifier having capacitive feedback; in that case, the scaling factor ($\sqrt{2}$) and filter loss can be accommodated by giving the filter 88 an appropriate gain. Other methods of accommodating for the scaling factor which are well known in the art may be chosen as desired.

The first aspect of the invention, as described in conjunction with FIGS. 3 and 6, provides true distance to way point by synchronously demodulating the signal at the center of an RC series circuit having the X and Y difference signal applied thereto. In accordance with another aspect of the invention, the true distance to an offset way point may be similarly and simply provided as illustrated in FIG. 3 by utilizing the principals of my copending application Ser. No. 268,255 entitled RESOLUTION OF TRIANGLE FROM HYPOTENUSE AND ONE SIDE, and filed on even date herewith. In FIG. 3, the apparatus 100 within the dashed line comprises means for solving for the base of a triangle from the hypotenuse and one side as disclosed in my aforementioned copending application. Briefly, the signal on the line 78 has a magnitude proportional to the distance to the way point and therefore comprises the hypotenuse of a triangle referring to FIG. 2, this is the area nav D.W.P., that is, the distance to the way point which an area navigation equipment provides as relating to the original way point. A signal on a line 102 comprises a DC signal representative of the desired offset of the parallel track from the original track. As seen in FIG. 2 this represents the offset distance. The offset distance also comprises one side of the triangle and the distance to the offset way point in FIG. 2 comprises the base of a triangle. The offset signal on the line 102 can be provided by any suitable offset selecting mechanism 104 in response to an operator controlled knob 106. The signal on the line 102 is supplied to an absolute amplifier, 108, which however may be eliminated if desired as described in my copending application. The output of the amplifier 108 on a line 110 is applied to the low input of a compare circuit 112 and to an inverter 113, the output of which is supplied to the high input of a comparator 114. The D.W.P. related signal on the line 78 is applied to the other inputs of the compare circuits 112, 114. In operation, the compare circuits 112 provides a signal on a line 116 so as to set a bistable device 118 at that point in a cycle where the instantaneous value of the sinusoidal wave on the line 78 becomes as positive as the magnitude of the DC signal on the line 110. Similarly, the comparator 114 will provide a signal on a line 120 to reset the bistable device 118 at that point in a cycle when the instantaneous value of the sinusoidal wave on the line 78 becomes as negative as the inverse of the DC signal on the line 110. The output of the bistable device 118 on a line 122 therefore comprises a square wave at the same frequency as the sinusoidal wave 78 but phase shifted therefrom in an amount which is equal to the angle $\theta$ (FIG. 2) opposite to the side of the triangle (as represented by the offset signal on the line 110). As described in my copending application, applying this signal to the phase reference phase input of the synchronous demodulator 84a which receives the sinusoidal signal on a line 78 at the signal input thereto will provide at the output thereof on the line 86a a signal having an average magnitude which is equal to the base of the triangle (the hypotenuse times the cosine of $\theta$). By passing this through a suitable filter 88a there is provided on a signal line 90a a DC signal having a magnitude proportional to true distance to the way point or to the offset way point in dependence upon whether the signal on the line 102 is zero or not, respectively.

In order to completely facilitate flying of a parallel track which is offset from the track to a selected way point which has been entered into the area navigation computer, this invention also provides for subtracting the offset from the cross track error in a differencing circuit 124 which has at its in phase input the normal cross track error signal on the line 62 and has at its out of phase input the offset signal on the line 102. This provides a signal on the line 126 which is equal to the cross track error minus the offset. When an original track is being flown, the offset is zero so the difference circuit 124 provides the cross track error on the line 126 equal to the cross track error on the line 62. But when there is an offset so that the parallel course is being flown as shown in FIG. 2, the differencing circuit 124 subtracts the offset from the cross track error so that the parallel track can be flown simply by monitoring the cross track error signal.

Thus the present invention provides a true distance to way point signal, whether the way point be the original way point set into the area navigation equipment or be an offset way point for flying a parallel course. The present invention also provides cross track error with any intended offset subtracted therefrom so that the regular cross track error indication can be monitored to fly a parallel course.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. An aircraft navigation computer comprising:
 a resistor/capacitor series circuit;
 means for applying to one end of said resistor/capacitor series circuit a sinusoidal signal having a magnitude proportional to one orthogonal coordinate of an aircraft with respect to a selected way point and for applying to the other end of said resistor/capacitor series circuit a sinusoidal signal having a magnitude proportional to a quadrature coordinate of an aircraft with respect to a way point;
 means connected for response to a signal developed at the junction of said capacitor and said resistor for synchronously demodulating said junction signal using a reference signal derived from said junction signal as a phase reference to provide a distance signal, the average magnitude of which is proportional to the true distance of the aircraft to the way point.

2. The computer according to claim 1 further comprising a filter connected to the output of said synchronous demodulating means for providing a DC signal, the magnitude of which is proportional to the true distance of the aircraft to the way point.

3. An aircraft navigation computer comprising:
 a resistor/capacitor series circuit;
 first means applying to one end of said resistor/capacitor series circuit a sinusoidal signal having a magnitude proportional to one orthogonal coordinate of an aircraft with respect to a selected way point and for applying to the other end of said resistor/capacitor series circuit a sinusoidal signal having a magnitude proportional to a quadrature coordinate of an aircraft with respect to said way point, said resistor/capacitor series circuit developing at the junction of said capacitor with said resistor a sinusoidal junction signal having a magnitude which is proportional to the true distance to the aircraft to the way point;
 second means providing a DC signal the magnitude of which is proportional to the amount by which a track, which is desired to be flow parallel to the track to said selected way point, is offset from the track to the selected way point;
 third means connected for response to the output of said second means and to the signal at said junction for generating a square wave signal at the same frequency as said sinusoidal junction signal but phase shifted therefrom in an amount proportional to the relative magnitudes of said sinusoidal junction signal and said DC signal; and
 fourth means connected to said junction and said third means and responsive to said sinusoidal junction signal and to said square wave signal for providing an output signal having an average magnitude proportional to the instantaneous true distance of the aircraft to a point offset from said way point by a distance equal to said offset distance in a direction perpendicular to the track of said aircraft to said selected way point.

4. An aircraft navigation computer comprising:
 first means providing signals representative of coordinates of an aircraft relative to an aircraft navigation ground station;
 second means providing signals representative of coordinates of a selected way point with respect to said ground station;
 third means connected for response to said first and second means and responsive to the signals therefrom for developing a signal representative of the true distance of the aircraft to the selected way point;
 fourth means providing a signal representative of a distance by which a track which it is desired to be flown, parallel with the track from the aircraft to said selected way point, is to be offset from the track to the selected way point; and
 means responsive to said third and fourth means for developing a signal representative of the true distance of the aircraft to a point which is offset from said selected way point in a direction perpendicular to the track to said selected way point by the same amount as said parallel track is offset from the track to said selected way point.

* * * * *